(12) United States Patent
Furuichi et al.

(10) Patent No.: US 9,824,224 B2
(45) Date of Patent: Nov. 21, 2017

(54) SECURITY-MINDED CLONING METHOD, SYSTEM AND PROGRAM

(71) Applicant: International Business Machines Corporation, Armonk, NY (US)

(72) Inventors: Sanehiro Furuichi, Tokyo (JP); Yohkichi Sasatani, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 13/956,981

(22) Filed: Aug. 1, 2013

(65) Prior Publication Data

US 2014/0040976 A1 Feb. 6, 2014

(30) Foreign Application Priority Data

Aug. 2, 2012 (JP) ................................. 2012-172084

(51) Int. Cl.
| | | |
|---|---|---|
| *G06F 17/00* | (2006.01) | |
| *G06F 21/60* | (2013.01) | |
| *G06F 21/62* | (2013.01) | |

(52) U.S. Cl.
CPC .......... *G06F 21/60* (2013.01); *G06F 21/6245* (2013.01); *G06F 2221/2113* (2013.01)

(58) Field of Classification Search
CPC .................................................... G06F 9/5077
USPC ............................................................ 726/1
See application file for complete search history.

(56) References Cited

U.S. PATENT DOCUMENTS

| | | | |
|---|---|---|---|
| 2008/0021917 A1* | 1/2008 | Baker et al. ................... | 707/102 |
| 2011/0119729 A1* | 5/2011 | Bergeson .............. | G06F 9/5061 |
| | | | 726/1 |
| 2012/0291030 A1* | 11/2012 | Fitzgerald et al. ............... | 718/1 |

FOREIGN PATENT DOCUMENTS

| | | |
|---|---|---|
| JP | H06187275 A | 7/1994 |
| JP | H10105432 A | 4/1998 |
| JP | H11272529 A | 10/1999 |
| JP | H11345145 A | 12/1999 |
| JP | 2005063224 A | 3/2005 |

(Continued)

OTHER PUBLICATIONS

Murata et al., Provisioning of Standardized Business Systems, Fujitsu Sci. Tech. J., vol. 47, No. 3, pp. 293-299, Jul. 2011, http://www.fujitsu.com/downloads/MAG/vol47-3/paper06.pdf.*

*Primary Examiner* — Taghi Arani
*Assistant Examiner* — Khalil Naghdali
(74) *Attorney, Agent, or Firm* — Yee & Associates, P.C.; Richard A. Wilhelm

(57) ABSTRACT

In order to solve this problem, the first aspect of the present invention is a system for duplicating (cloning) a physical environment in a virtual environment using CMDB, the system comprising: means for setting a level of confidentiality for attributes of configuration items (CI) of CMDB managing the source hardware information and software information, and means for sending CMDB information including CI having the level of confidentiality set to a virtual environment constructing means connected via a network; the virtual environment constructing means having a means for constructing the source environment in a virtual environment based on sent CMDB information; and the sending means having a means for changing the level of confidentiality of CI attributes having the level of confidentiality set in accordance with a default confidentiality policy.

20 Claims, 11 Drawing Sheets

(56) References Cited

FOREIGN PATENT DOCUMENTS

| | | | |
|---|---|---|---|
| JP | 2005157786 A | 6/2005 | |
| JP | 2005227868 A | 8/2005 | |
| JP | 2007072957 A | 3/2007 | |
| JP | 2007509404 A | 4/2007 | |
| JP | 2007226287 A | 9/2007 | |
| JP | 2007535723 A | 12/2007 | |
| JP | 2009199360 A | 9/2009 | |
| JP | 2010-256997 | * 11/2010 | ............. G06F 11/28 |
| JP | 2010256997 A | 11/2010 | |
| JP | 2011504256 A | 2/2011 | |
| WO | WO2009096030 A2 | 8/2009 | |

* cited by examiner

SECURITY-MINDED CLONING METHOD, SYSTEM AND PROGRAM

CROSS-REFERENCE TO RELATED APPLICATION(S)

This Application claims the benefit of priority to Japanese Patent Application Serial No. 2012-172084, filed on Aug. 2, 2012, the contents of which are hereby incorporated by reference.

TECHNICAL FIELD

The present invention relates to a cloning technology and, more specifically, to a security-minded cloning method, system, and program.

BACKGROUND ART

In recent years, cloning techniques have been used to prepare computing resources in the cloud and replicate (reproduce) a user environment. User environments are reproduced in a virtual environment remotely from a user environment confidentially and without enabling direct access for a variety of purposes, including identifying problems, operational support, performance tuning, reviewing the current environment, and supporting the transition to a new environment.

Reproducing a user environment in the cloud means duplicating (cloning) a physical (non-virtual) environment in a virtual environment. In cloning to a virtual environment, computer resources such as a CPU, memory, storage, network, and software are provided (provisioned) virtually, and a user environment resembling the actual user environment is constructed in the cloud.

However, a user environment cannot be flexibly reproduced and constructed in the cloud using current cloning techniques while also taking into account user security issues.

Techniques for reproducing application test environments are described in Patent Literature 1 and 2. A method for reproducing a system environment and a technique for modifying a system environment are described in Patent Literature 3. However, the literature does not mention a method for reproducing software or a system environment while maintaining reproduction accuracy and taking into account confidential information.

CITATION LIST

Patent Literature

Patent Literature 1 Laid-open Patent Publication No. 2005-157786
Patent Literature 2 Laid-open Patent Publication No. 6-187275
Patent Literature 3 Laid-open Patent Publication No. 2007-226287

SUMMARY OF INVENTION

Technical Problems

Therefore, an object of the present invention is to provide a security-minded cloning method.

Another object is to provide a cloning method which maintains reproduction accuracy of a user environment in the cloud while also taking into account confidentiality.

Another object is to provide a cloning method able to appropriately filter confidential information.

Another object is to provide a cloning method able to dynamically change confidential information.

Another object is to provide a method and system for reproducing a user environment in the cloud while only disclosing enough confidential user information for the purpose at hand, including identifying problems, operational support, performance tuning, reviewing the current environment, and supporting the transition to a new environment.

Solution to Problems

In order to accurately reproduce a user environment, the present inventor constructed (cloned) a user environment in the cloud using the values of the configuration management database (CMDB) in the system of the user. At this time, the user environment was constructed while filtering sensitive data. By dynamically changing the degree of filtering, a user environment can be accurately reproduced while maintaining the degree of confidentiality permitted by the user In order to achieve this object, a first aspect of the present invention is . . . .

. . . a system for duplicating (cloning) a physical environment in a virtual environment using CMDB, the system including: means for setting a level of confidentiality for attributes of configuration items (CI) of a CMDB managing the source hardware information and software information, and
means for sending CMDB information including CI having the level of confidentiality set to a virtual environment constructing means connected via a network. Here, the virtual environment constructing means has a means for constructing the source environment in a virtual environment based on sent CMDB information, and the sending means has a means for changing the level of confidentiality of CI attributes having the level of confidentiality set in accordance with a default confidentiality policy.

Also, a system is provided in which the default confidentiality policy specifies the highest level of confidentiality, and the sending means does not send CI having attributes whose level is set higher than the highest level of confidentiality.

Also, a system is provided in which the default confidentiality policy specifies the highest level of confidentiality, and the sending means masks and sends configuration values of attributes whose level is set higher than the highest level of confidentiality.

Also, a system is provided in which the sending means changes the masking strength in accordance with the difference in the highest level of confidentiality and the confidentiality level set for the attribute.

Also, a system is provided with a problem analyzing unit, and a problem is reproduced in the virtual environment when the source environment has a problem.

Another aspect is a method for duplicating (cloning) a physical environment in a virtual environment using CMDB, in which the method includes the steps of: setting a level of confidentiality for attributes of configuration items (CI) of CMDB managing the source hardware information and software information, and sending CMDB information including CI having the level of confidentiality set to a virtual environment constructing means connected via a network. Here, the virtual environment constructing step has a step for constructing the source environment in a virtual environment based on sent CMDB information, and the sending step has a step for changing the level of confidentiality of CI attributes having the level of confidentiality set in accordance with a default confidentiality policy.

Also, a computer program is provided enabling a computer to execute each step of this method.

Effect of the Invention

The present invention enables a user environment to be accurately reproduced in the cloud while maintaining the degree of confidentiality permitted by the user. Also, a method and system are provided which enable a user environment to be reproduced in the cloud while only disclosing enough confidential user information for the purpose at hand, including identifying problems, operational support, performance tuning, reviewing the current environment, and supporting the transition to a new environment.

DESCRIPTION OF EMBODIMENT

Figure 1:
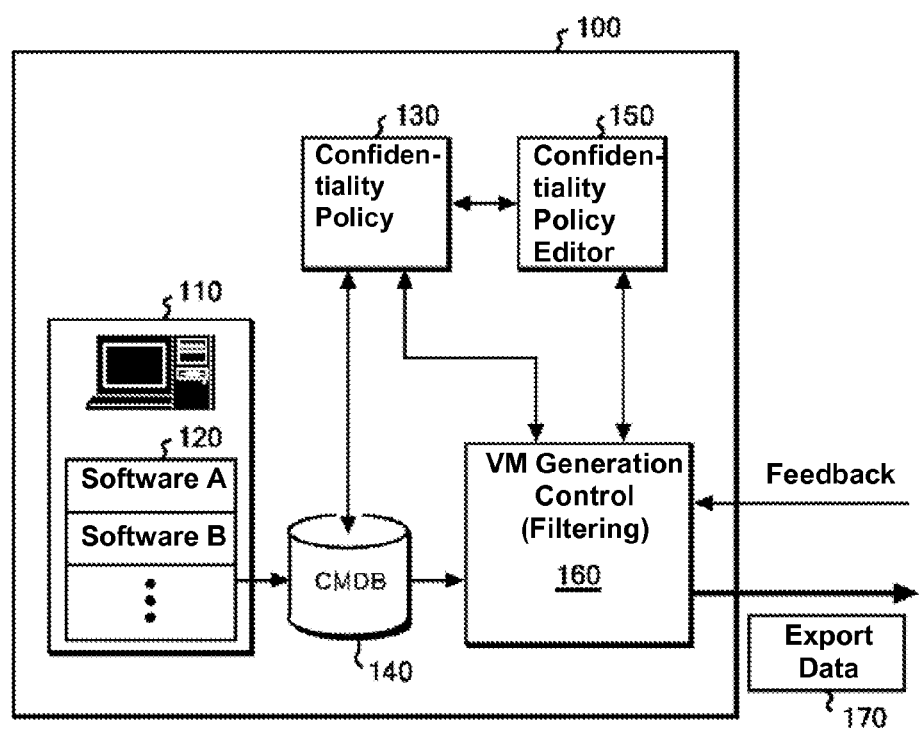
FIG. 1 is a configuration diagram of the virtual environment constructing system in an embodiment of the present invention.

The present invention will be explained below with reference to the embodiments shown in the drawings, but the present invention is not limited in any way to the embodiments shown in the drawings.

In the present invention, copying a user environment from a physical (non-virtual) environment to a virtual environment is called cloning to a virtual environment (or simply cloning). Cloning from virtual environment to virtual environment is not the primary concern of the present invention because this is simply the duplication of a virtual machine.

FIG. 1 is a configuration diagram of the virtual environment constructing system 100 in an embodiment of the present invention. In FIG. 1, the user environment 110 consists of a hardware configuration and a software configuration. The software configuration 120 can be defined and managed by a configuration management database 140 (CMDB).

There are no particular limits on the computer devices in the virtual environment constructing system 100 and the user system in FIG. 1. These can be personal computers, servers, and notebook terminals. In addition to a CPU and RAM, the computer device includes input devices such as a mouse and keyboard, and a display device such as a display. It is operated under the control of an operating system such as Windows™, Linux™, or MacOSX™.

A configuration management database (CMDB) is an essential component for complying with the guidelines of IT service management as defined by the IT Infrastructure Library® (ITIL), and is a database for centralized management of information related to IT service management. The following is a summary of a CMDB.

In the CMDB data model, the items managed in a distributed network environment are defined as configuration items (CI). For example, items defined as configuration items (CI) include computer devices such as servers and client terminals, hardware such as network devices and storage devices, software such as operating systems (OS), middleware, package software, and management tools.

The CMDB manages defined CIs along with their attributes. In the management of CI, attributes are concepts used to identify and describe individual CI. In the CMDB data model, the generic name, the product name, the serial number, the manufacturer, etc. are defined as attributes.

Also, the CMDB manages information on the relationship between CIs in order to achieve a high level of configuration management, such as impact analysis. In this regard, the relationship between individual CIs is defined in the CMDB data model. Examples of relationships include assigns, canConnect, canUse, connectAt, connects, controls, deployedOn, Located, Managed, Owned, provides, runAt, uses, and usedBy.

The management software for CMDB periodically retrieves OS setting files and configuration information, for example, using SSH (secure shell) and so on, and executes setting verification commands to automatically discover CI attributes scattered throughout the distributed network environment and their relationship to other CIs (discovery) and to update the CMDB (tracking). This ends the brief explanation of a CMDB.

In the present embodiment, the CMDB 140 defines the hardware and software attributes in the CI of the user environment 110, and manages configuration values having attributes (attribute values) along with relationship information to other CIs. Here, the configuration values are setting values (parameters) to attributes indicating the functions and operations of hardware and software.

The CI and their attributes and configuration values in the CMDB may be understood to generate the reproduced environment (clone) of the user environment. However, it cannot simply be cloned because management of security for the user environment is lacking. Even when the user may wish to clone the user environment, as little confidential information as possible must be divulged.

In the present invention, a confidentiality level (security level) is added to the attributes of each CI. This confidentiality level indicates the degree to which the CI is to remain confidential. A higher value indicates a greater degree of confidentiality. Generally, if user ID information has a confidentiality level of three, a password has a confidentiality level of four or more.

By adding a confidentiality level to the attributes of a CI, confidential information in configuration values (attribute values) can be adequately protected. For example, when the attribute of a CI is a user ID, the actual content is not used if the confidentiality level is three. If the confidentiality level is 1 or 0, the current user ID may be used in the virtual environment. In other words, by setting a confidentiality level for the attributes of each CI, the external dissemination of configuration values in a CMDB can be adequately restricted.

A confidentiality policy 130 is introduced to define confidentiality levels. The confidentiality policy 130 is a template for adding confidentiality levels to the attributes of CIs. This confidentiality policy 130 can be edited by a confidentiality policy editor 150.

Figure 3:
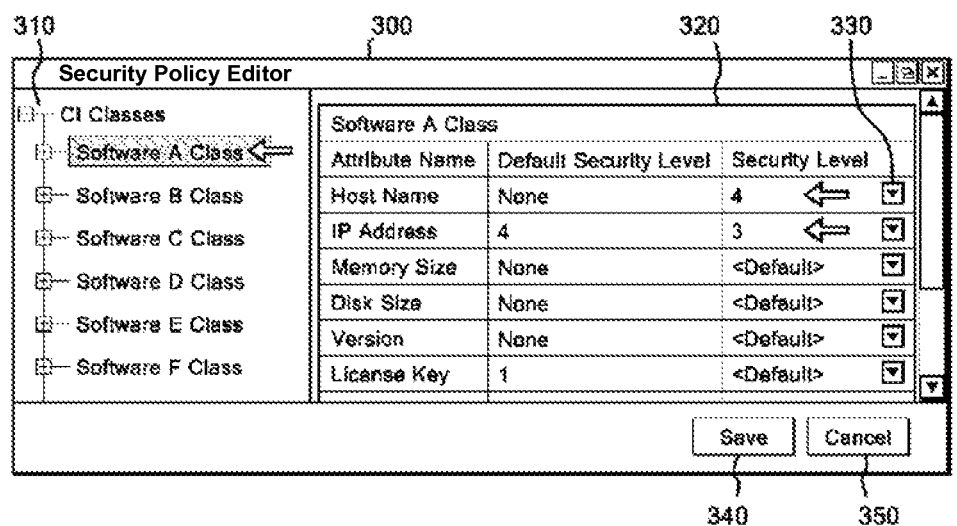
FIG. 3 is a GUI example of a confidentiality policy editor 300.

FIG. 3 shows an example of a GUI for a confidentiality policy editor 300. The confidentiality policy editor 300 is divided into two major portions: a CI selection area 310 and a confidentiality level indicating portion 320. First, the CI selection area is used to select the confidentiality level setting for classes of CI. In this example, Software A is selected. The classes of CI are preferably displayed as a tree based on the content of the configuration. In FIG. 3, the version of Software A can be selected, for example, Version 1.0 or Version 2.0, by expanding the tree.

The confidentiality level indicating portion 320 is used to apply a confidentiality level to attributes included in the selected Software A. The table includes attribute names, default confidentiality levels, and user indicated confidentiality levels. In the example shown in FIG. 3, there is no default confidentiality level for the attribute name Host-Name, so the user indicates confidentiality level four. Similarly, the default confidentiality level of the IP address is four, but the user specifies a confidentiality level of three.

Here, the confidentiality level of a CI attribute is saved by pressing the Save button 340. The entered content is not saved when the Cancel button 350 is pressed. Default values and other predetermined values can be selected using the pull down menu 330.

Figure 5:
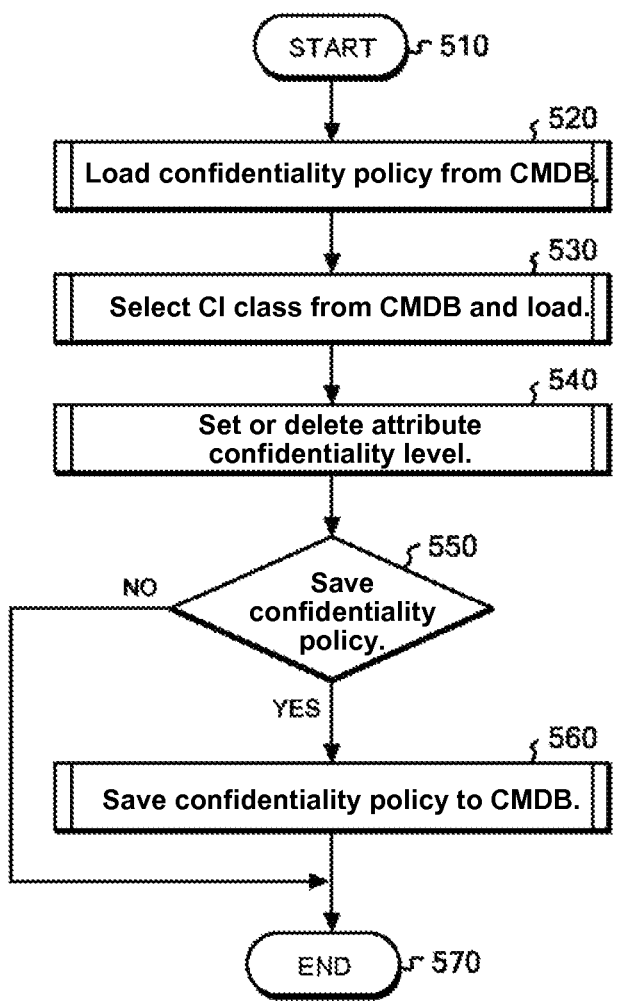
FIG. 5 is a flowchart of the confidentiality policy editing process.

FIG. 5 shows the flowchart for the confidentiality policy editing process. In Step 510, the confidentiality policy editor is activated. In Step 520, the confidentiality policy is loaded from the CMDB 140. In Step 530, a CI class is selected from the CMDB and loaded. In Step 540, a confidentiality level is set for the attribute, or a set confidentiality level is deleted. In Step 550, it is determined whether or not the confidentiality policy is to be saved. If not, the process proceeds to Step 570 and ends. If so, the confidentiality level policy is saved to the CMDB.

In FIG. 1, a confidentiality level is added to each CI in the CMDB 140 in accordance with the confidentiality policy 130. The virtual machine (VM) generation control unit 160 references the confidentiality policy 150 for each CI to which a confidentiality level has been added, filters the confidentiality levels, and requests VM generation. In the present embodiment, VM generation is embodied without a problem if there is a computer resource environment connected via a network.

The VM generation control unit 160 specifies the confidentiality level of a CI indicated by the user as the highest confidentiality level permitted as export data. The confidentiality level of the CI can be changed based on feedback from the CMDB in the cloud.

Here, the highest level of confidentiality indicates the highest confidentiality level among all of the CIs in the user environment that can be exported to the cloud. If there is a CI which exceeds the highest confidentiality level, the configuration value of the CI reverts to the default value. In this way, confidentiality levels can be filtered to keep configuration values of concern to the user from being exported.

If the attribute confidentiality level of HostName is one, IPAddress is two, the user ID is three, and the password is four, but the highest confidentiality level is two, the configuration value of the user ID and the configuration value of the password are not sent.

The masking strength of a configuration value can be changed depending on the difference between the confidentiality level set for the attribute and the highest confidentiality level. Because, in this example, the difference between the user ID and the highest confidentiality level is one, the configuration value of the user ID (for example, 'John_ and_Marry') is not sent, but instead a partially masked configuration value (for example, 'Joxxxxxxxxxxxx') is sent. Because the difference between the confidentiality level of the password and the highest confidentiality level is two, the configuration value of the password (for example, 'secret') is not sent, but instead a fully masked configuration value of the same length (for example, 'xxxxx') is sent. Here, the masking strength is increased as the difference between the confidentiality level set for the attribute and the highest confidentiality level increases. This masking technique can also be applied to the present invention based on the type, strength, or level of an attribute.

Figure 6:
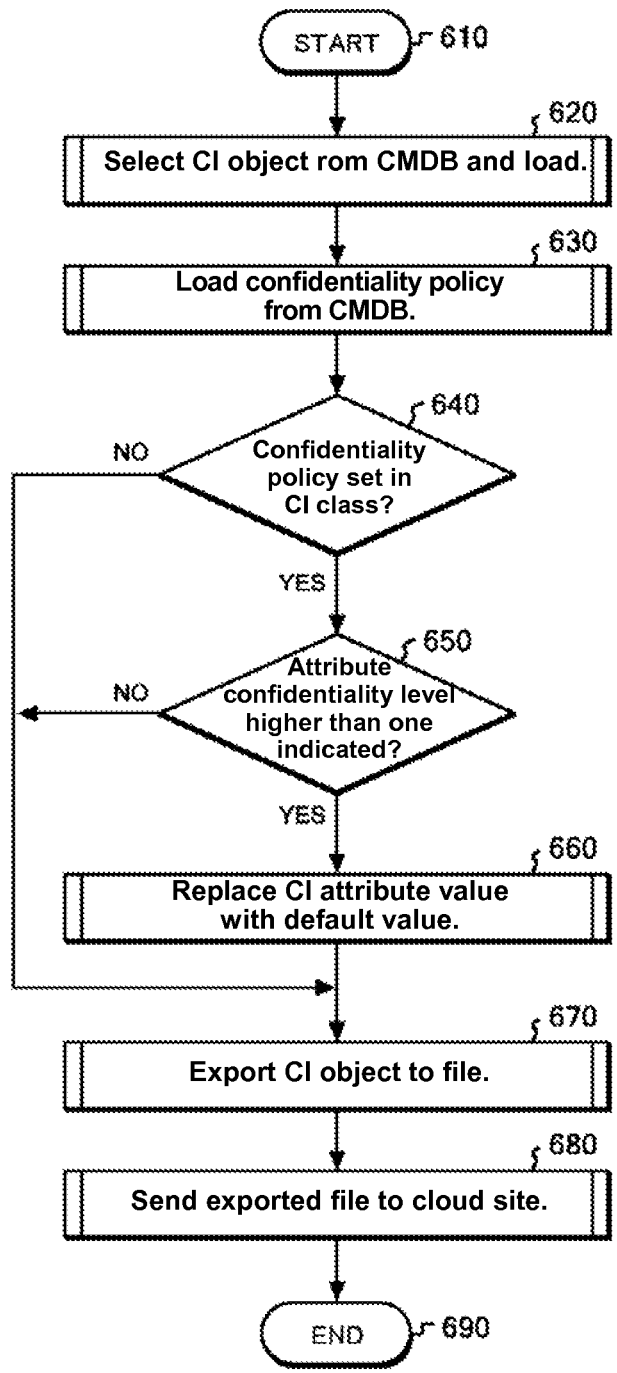
FIG. 6 is a flowchart of the VM generation control unit.

FIG. 6 is a flowchart of the processing performed by the VM generation control unit. After the process has started up in Step 610, a CI object is selected from the CMDB 140 and loaded in Step 620. In Step 630, the confidentiality policy is loaded from the CMDB. Next, in Step 640, it is determined whether or not the confidentiality policy has been set for the CI class. When set, the process proceeds to Step 650. When not set, the process proceeds to Step 670. In Step 650, it is determined whether the confidentiality level of the attribute is higher than the indicated confidentiality level (highest confidentiality level). In Step 670, the CI object is exported to a file (export data 170). Finally, in Step 680, the exported file (export data 170) is sent to a site in the cloud.

The VM is usually connected via a network to the cloud. The VM apportions and uses computer resources such as a CPU, memory, storage and the network. In this way, it can separately yet simultaneously execute a plurality of systems on a single computer. This also makes it easy to copy a system.

Figure 10:
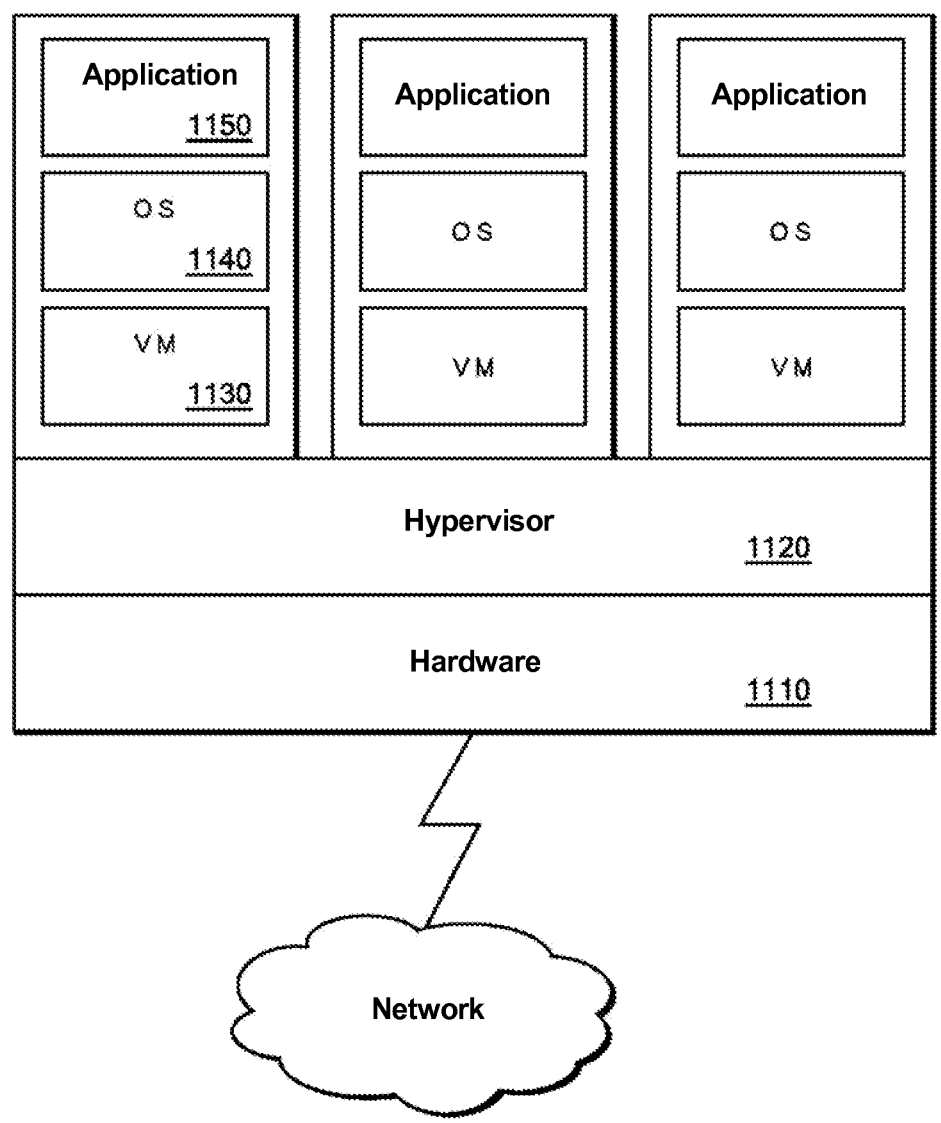
FIG. 10 is a configuration diagram of a typical VM environment in the cloud.

FIG. 10 is a configuration diagram of a typical VM environment in a cloud. The hardware 1110 in the host executes software to run a VM called a hypervisor 1120. A plurality of VMs 1130 are run in parallel by the hypervisor 1120. Examples of VM 1130 include VMware™ and Xen™. A guest OS 1140 is also run on each VM, and an application 1150 used by the user is run on the guest OS 1140. In the present invention, the clone of the user environment comprises a guest OS 1140 and applications 1150.

The VM generation control unit 160 has a function which directs VM generation in the cloud. The generation directing function includes selecting the computer (hardware) and software in the user environment 110 to be cloned, selecting a site in the cloud, selecting a customer ID, and indicating the highest confidentiality level.

Figure 4:
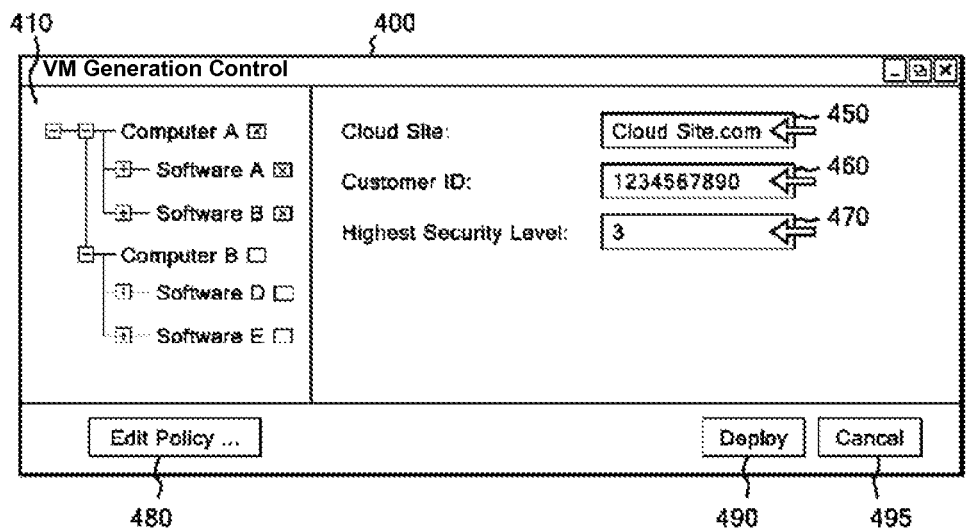
FIG. 4 is a GUI example of the VM generation control unit 160.

FIG. 4 is a GUI example of the VM generation control unit 160. The VM generation control unit 160 includes a selection area 410 for selecting the computer and software in the user environment 110 to be cloned in the VM, a selection area 450 for selecting a site in the cloud, a selection area 460 for selecting a customer ID, and a specifying portion 470 for specifying the highest confidentiality level.

In the example shown in FIG. 4, Computer A is selected in check box 420, and Software A and Software B are selected in check boxes 430 and 440.

The VM generation control unit 160 preferably has a button 480 for activating the confidentiality policy editor 150 to reference and edit confidentiality levels. When button 490 is finally pressed, a VM is instructed to generate the environment indicated on the screen. VM generation can be cancelled by pressing the Cancel button 495.

Figure 2:
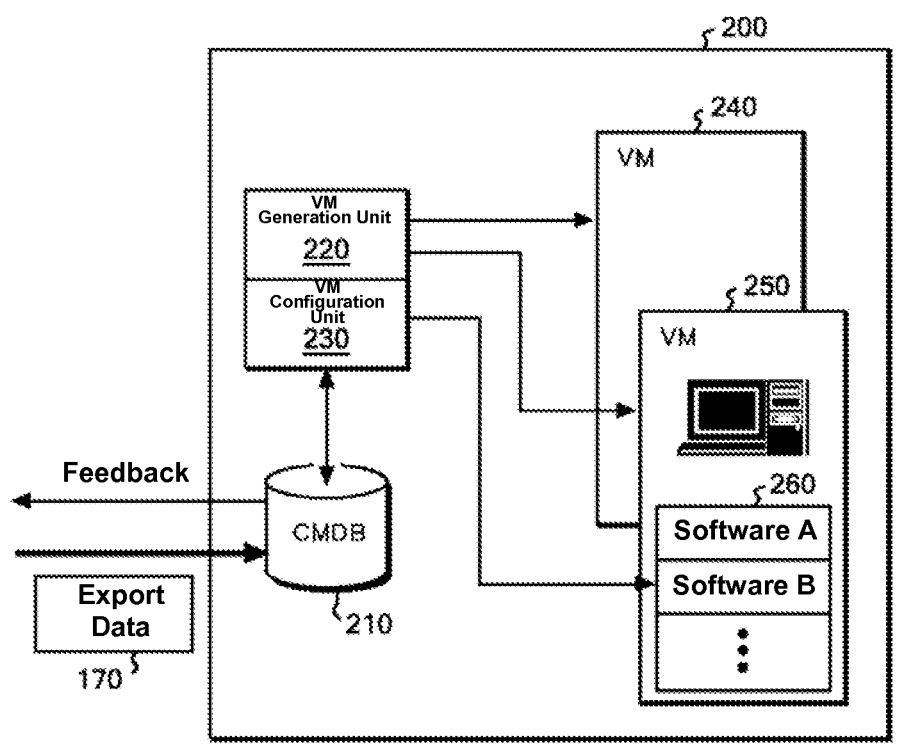
FIG. 2 is a diagram showing VM generation and environment construction.

FIG. 2 is a diagram showing VM generation and environment construction in the cloud 200. The CMDB 210 receiving the export data 170 directs the generation of VM 250 in the VM generation unit 220 based on the data, and sends all of the CI attributes and configuration values to the VM 230 as VM configuration data.

The VM generation unit 220 performs VM generation and reproduced environment construction. In the content of the reproduced environment construction, the type of CPU (x86, PowerPC, etc.) is selected, and resource information such as memory size, the HDD, the logic device and the network is set. The OS and software applications are automatically introduced. The technology used to generate a VM and construct an environment in the cloud are well known, so further explanation has been omitted.

Software applications are usually introduced using provisioning technology, and is not performed in real time (actually, in a short period of time), because prepared images of the indicated OS and software combination is simply loaded into the VM. Windows™, open source software such as Linux™, or AIX™ can be selected as the operating system. If a prepared image does not exist, the application is introduced for the first time using an installer.

When generation of the VM 250 has been completed by the VM generation unit 220, the VM configuration unit 230 constructs a clone of the user environment in the VM 250 based on the CI attributes and configuration values (parameters) received from the CMDB 210. When environment construction has been completed, feedback is sent from the CMDB 210 to the VM generation control unit 160. The feedback includes VM generation start information and end information, the end of environment construction, configuration errors, problem reproduction results, and requests for a change in the confidentiality level. An example of a product used in VM generation and environment construction is the IBM Tivoli Service Automation Manager (TivSAM).

In the present invention, the technology employed by the VM generation unit 220 and the VM configuration unit 230 to construct a virtual environment is not described in detail. However, a function summary is provided as part of explaining the embodiment. The product providing the virtualization technology is provided in a form combining hardware, software, and services optimized for the cloud as it currently exists. The virtualization technology is provided in a manner that takes full advantage of existing hardware and existing resources in service management.

After installation, the configuration is automated, the management stack is deployed, a plurality of VLAN and subnets are pooled, and the environment is separated. In order to flexibly customize the environment, additional software to be installed in the deployed image is selected, and changes are made before and after deployment. In other words, the CPU, memory, disk space, and reserved allocation of resources can be changed. In the present invention, a clone of the user environment is constructed in the cloud using virtualization technology and based on the user's desired confidentiality level.

Figure 7:
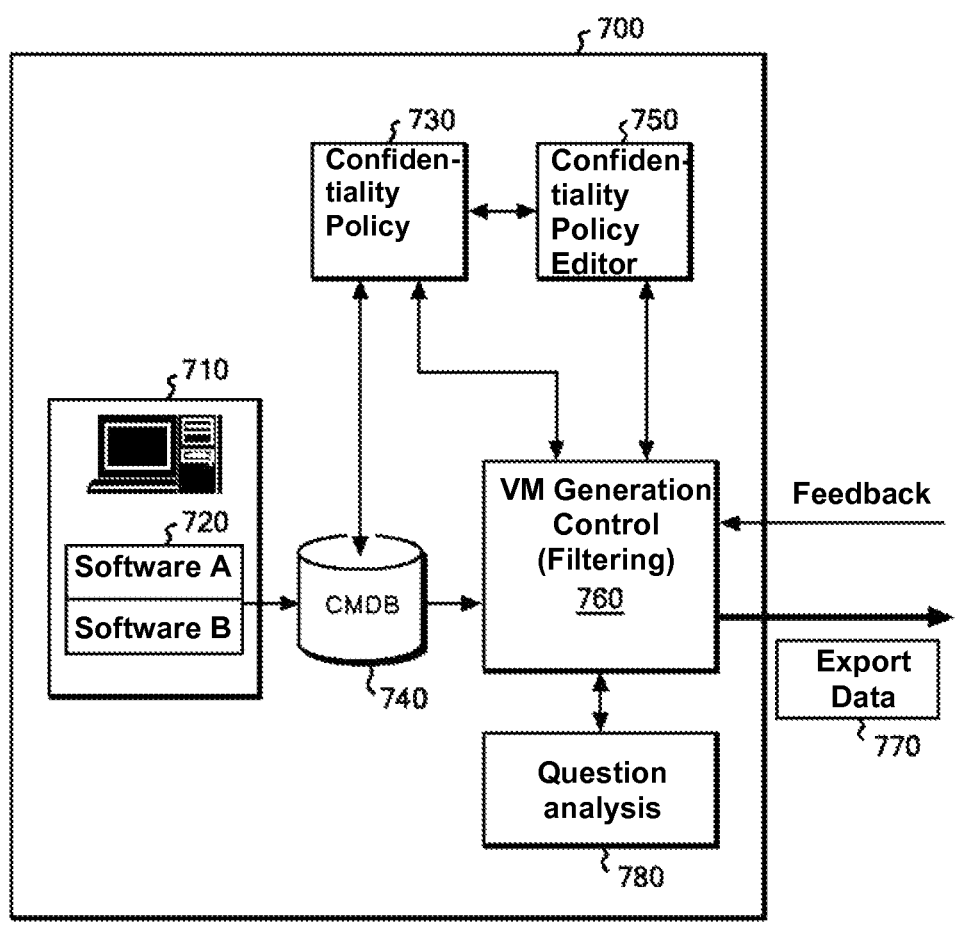
FIG. 7 is a configuration diagram of the user environment constructing system in another embodiment of the present invention.
Figure 8:
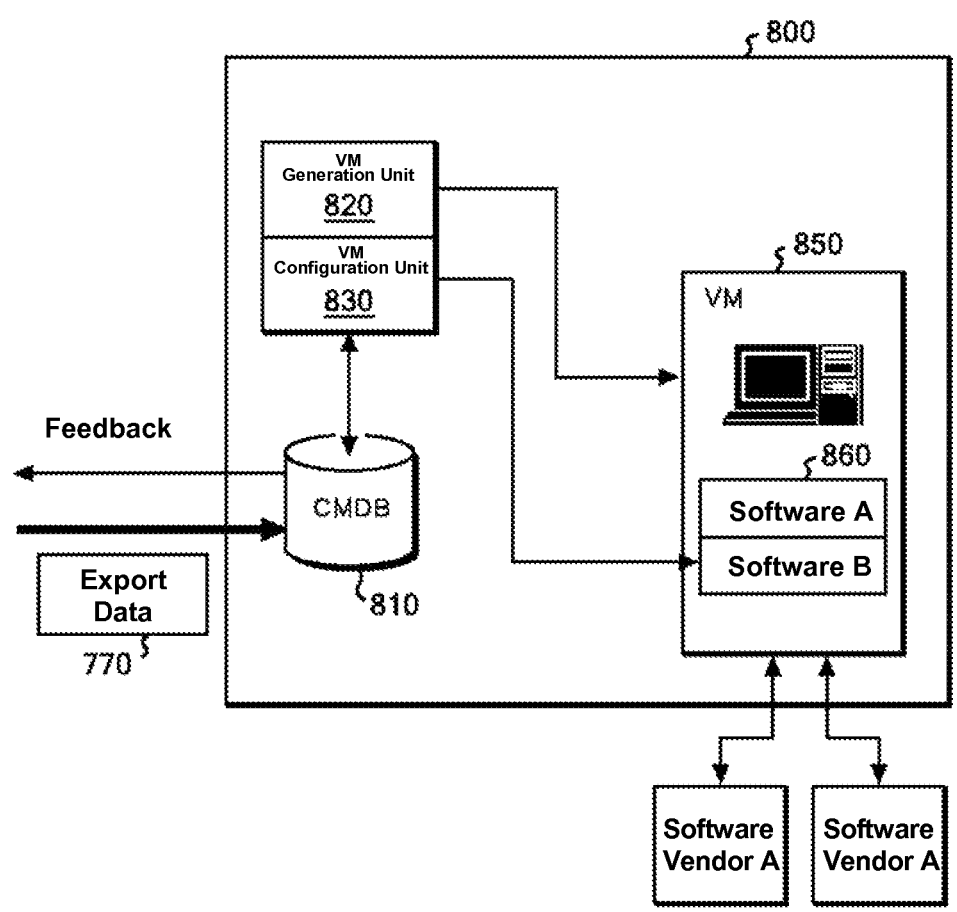
FIG. 8 is a diagram showing VM generation and environment construction.
Figure 9:
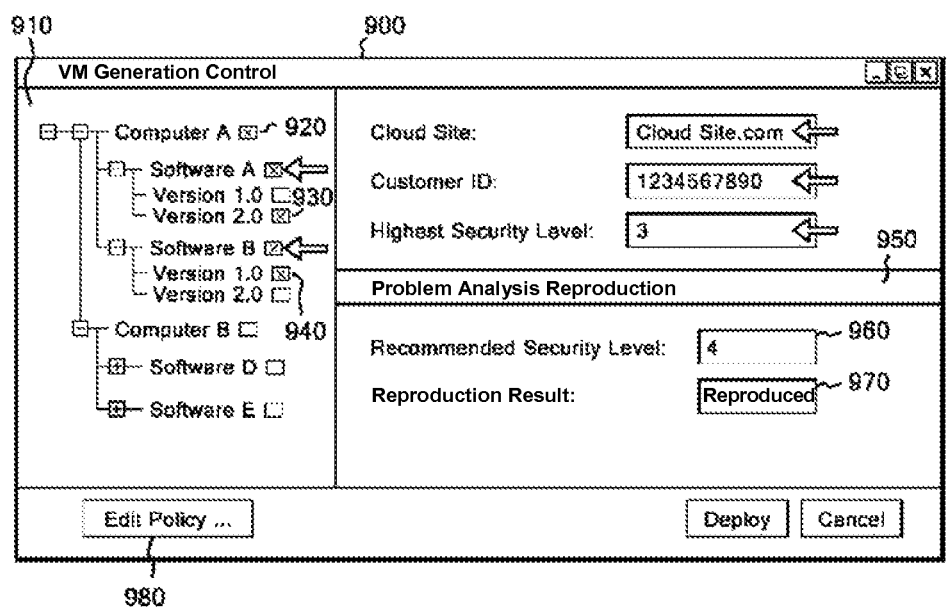
FIG. 9 is a GUI example of the VM generation control unit.

The following is an explanation of a second embodiment of the present invention with reference to FIG. 7 through FIG. 9 in which the present invention has been applied to a problem analyzing cloud. In this example, a problem has occurred when certain versions of Software A and Software B were used together in the user environment 710. Software A is a product of Company A, and Software B is a product of Company B.

Here, the user wants the problem analyzed without ruining the actual operating environment. Thus, the user environment is constructed in the cloud to analyze the problem there. The CMDB 740 includes CIs and their attributes from the current user environment, and also configuration values with the security levels indicated in the confidentiality policy 730. The confidentiality policy 730 can be edited using a confidentiality policy editor 750, and can be referenced from the VM generation control unit 760. The problem reproduction data from the CMDB 740 is filtered by the VM generation control unit 760, and sent as export data 770.

The problem analyzing unit 780 is the characteristic feature in FIG. 7. The problem analyzing unit determines whether the same problem has occurred in the cloud environment, and analyzes the problem. When it has determined that the same problem as the one that occurred in the real environment has not occurred based on feedback from the cloned environment in the cloud, it changes the filtering to the appropriate confidentiality level.

FIG. 9 shows a GUI example of VM generation control 760. In FIG. 9, the software configuration of the user environment is displayed in a detailed view 910. In FIG. 9, the selection box 920 for Computer A is checked, Software A is selected, and the selection box 930 for Version 2.0 is checked among the versions displayed. Also, Software B is selected, and the selection box 930 for Version 2.0 is checked among the versions displayed. The Deploy button is then pressed, and the user environment is generated in the VM.

FIG. 8 is a diagram showing VM generation and environment construction in the cloud 800 based on export data 770. The CMDB 810 receiving the export data 770 directs the generation of VM 850 in the VM generation unit 820 based on the data, and sends all of the CI attributes and configuration values to the VM configuration unit 830 as VM configuration data.

Software A and Software B are launched in the generated user environment 850, and the operational details are confirmed by Company A and Company B. Feedback is sent from the CMDB 810 to the VM generation control unit 760 concerning whether or not the problem could be reproduced.

The feedback includes VM generation start information and end information, environment construction completion, and configuration errors, etc. It also includes a problem reproduction report and a confidentiality level change request. When the software operates normally and the problem cannot be reproduced, a determination can be made to request a change in the filtering, or encourage a change in the highest confidentiality level in order to request disclosure of high confidentiality level information. Preferably, an instruction is issued including the appropriate confidentiality level for individual CI attributes.

In the example shown in FIG. 9, when feedback is received stating that the problem could not be reproduced, nothing is displayed in the reproduction result display area 970, and the recommended security level in the display is increased to four. When the user approves the change in the security level, the Deploy button is pressed again, and a test is run to reproduce the problem using the same process. When the problem has been reproduced, "reproduced" is displayed in the reproduction result display area 970 shown in FIG. 9.

In the example shown in FIG. 9, the reproduction problem associated with the combination of Version 2.0 of Software A and Version 2.0 of Software B is acknowledged, and Company A and Company B study the software problem closely in the cloned environment 850.

By using the configuration of the present invention in this manner, a user environment can be reproduced (cloned) in the cloud while protecting confidential information to the fullest extent possible. In the embodiments of the present application, the configuration combines both hardware and software. However, the present invention can be configured as dedicated hardware or a program executed by a computer.

Figure 11:
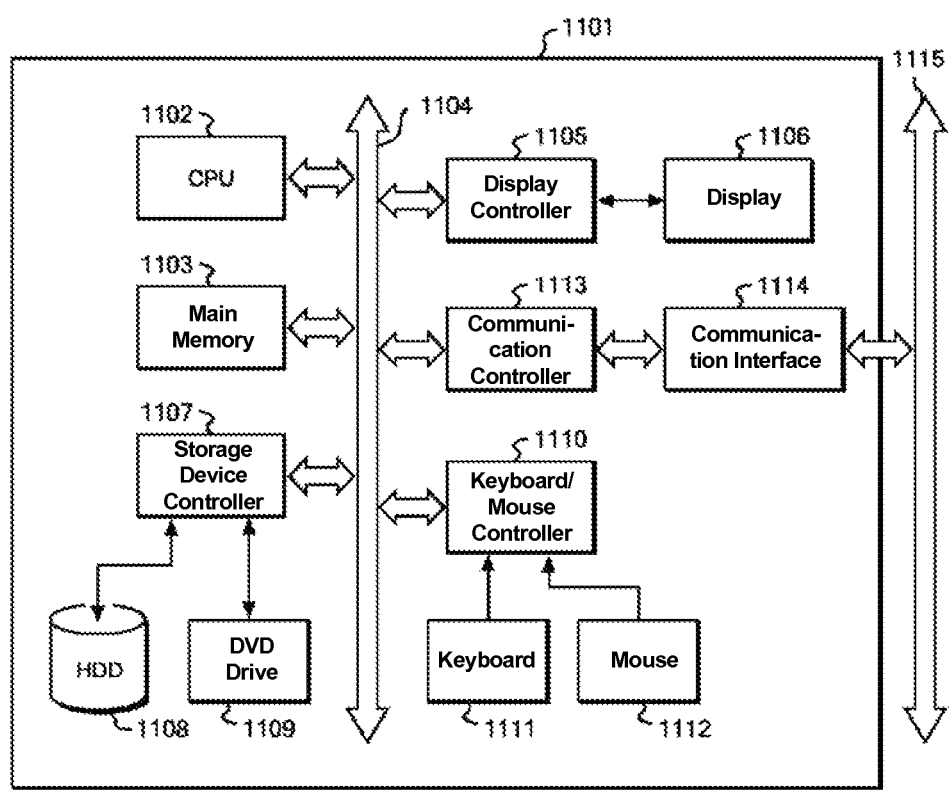
FIG. 11 is a block diagram of an example of computer hardware.

FIG. 11 is a block diagram of a VM generation control unit 160 and VM generating and configuring unit 230 of the present invention, and computer hardware used in the user environment. The computer device (1101) includes a CPU (1102) and main memory (1103) which are connected to a bus (1104). The CPU (1102) is zSeries®, Power PC®, or another CPU based on a 32-bit or 64-bit architecture, such as the Xeon® series, Core® series, Atom® series, Pentium® series or Celeron® series from Intel Corporation, or the Phenom® series, Athlon® series, Turion® series or Sempron® series from Advanced Micro Devices, Inc.

A display (1106) corresponding to display device 110 such as an LCD monitor is connected to the bus (1104) via a display controller (1105). The display (1106) is used to display applications, VM controls and VM construction. A hard disk (1108) or silicon disk, and CD-ROM, DVD drive or Blu-ray drive (1109) are connected to the bus (1104) via a memory device controller (1107).

Preferably, the programs of the present invention for VM generation control, VM generation and VM configuration are stored, along with the confidentiality policy, in these storage devices. An OS, applications, and CMDB may also be stored in the user environment. The programs and data are preferably loaded from the hard disk (1108) into the main memory (1103) and executed by the CPU (1102).

If necessary, the CD-ROM, DVD or Blu-ray drive (1109) is used to retrieve a program of the present invention and data from a computer-readable medium such as a CD-ROM, DVD-ROM or Blu-ray disk for installation on the hard drive. A keyboard (1111) and a mouse (1112) for moving a pointer are connected to the bus (1104) via keyboard/mouse controller (1111).

The communication interface (1114) uses, for example, the Ethernet® protocol. The communication interface (1114) is connected to the bus (1104) via a communication controller (1113), and is connected physically to a computer device and communication line (1115). Preferably, VM generation control and VM configuration are conducted via the TCP/IP communication protocol. Preferably, the cloud environment, user environment, CMDB and analyzing device are connected and manipulated via the communication line (1115).

The present invention was explained with reference to particular embodiments or examples. However, the present invention is not limited to these particular embodiments or examples. It can be embodied using dedicated hardware or as software communicating with a CMDB and generating a VM environment. The present invention can be altered in any way conceivable by a person of skill in the art, including other embodiments, additions, modifications, and deletions. Any aspect realizing the actions and effects of the present invention is within the scope of the present invention.

What is claimed is:

1. A system for duplicating a physical environment in a virtual environment using a configuration management database (CMDB), the system comprising a processor coupled to a memory having instructions stored therein that are operable when executed by the processor to perform steps of:
    setting a level of confidentiality for attributes of configuration items (CI) of the CMDB managing hardware information and software information of a source environment;
    sending CMDB information, including the CI having the level of confidentiality set, to a virtual environment connected to the system via a network;
    constructing the source environment in the virtual environment based on the CMDB information; and
    changing the level of confidentiality of at least one of the CI attributes in accordance with a confidentiality policy.

2. A system according to claim 1, wherein the confidentiality policy specifies a highest level of confidentiality, and a given CI having attributes whose level is set higher than the highest level of confidentiality is not sent to the virtual environment.

3. A system according to claim 1, wherein the confidentiality policy specifies a highest level of confidentiality, and a given CI having attributes whose level is set higher than the highest level of confidentiality are masked and sent to the virtual environment.

4. A system according to claim 3, further comprising changing a masking strength in accordance with a difference in the highest level of confidentiality and the confidentiality level set for the attribute.

5. A system according to claim 1, wherein the system is a problem reproducing system, and a problem is reproduced in the virtual environment in response to the source environment having a problem.

6. A system according to claim 1, wherein the step of setting the level of confidentiality comprises:
    adding the level of confidentiality to the attributes maintained by the CMDB.

7. A system according to claim 1, wherein the physical environment comprises a physical data processing system and the virtual environment comprises a virtual machine.

8. A system according to claim 7, wherein the physical data processing system comprises a central processing unit (CPU) and random access memory (RAM) that is operated under control of an operating system.

9. A system according to claim 1, wherein the CMDB is a database configured to store centralized management information related to information technology (IT) service management.

10. A system according to claim 1, further comprising:
    loading the confidentiality policy from the CMDB; and
    saving the confidentiality policy in the CMDB.

11. A method performed by a data processing system for duplicating a physical environment in a virtual environment using a configuration management database (CMDB), the method comprising the steps of:
    setting, by the data processing system, a level of confidentiality for attributes of configuration items (CI) of the CMDB managing hardware information and software information of a source operating environment;
    sending, by the data processing system, CMDB information, including the CI having the level of confidentiality set, to a virtual environment;
    constructing, by the data processing system, the source environment in the virtual environment based on the CMDB information; and
    changing, by the data processing system, the level of confidentiality of at least one of the CI attributes in accordance with a confidentiality policy.

12. A method according to claim 11, wherein the confidentiality policy specifies a highest level of confidentiality, and the sending step does not send a given CI having attributes whose level is set higher than the highest level of confidentiality.

13. A method according to claim 11, wherein the default confidentiality policy specifies a highest level of confidentiality, and the sending step masks and sends configuration values for a given CI having attributes whose level is set higher than the highest level of confidentiality.

14. A method according to claim 13, wherein the sending step changes a masking strength in accordance with the difference in the highest level of confidentiality and the confidentiality level set for the attribute.

15. A method according to claim 11, wherein the method is a problem reproducing method, and a problem is reproduced in the virtual environment in response to the source environment having a problem.

16. A method according to claim 11, wherein the step of setting the level of confidentiality comprises:

adding the level of confidentiality to the attributes maintained by the CMDB.

17. A method according to claim 11, wherein the physical environment comprises a physical data processing system and the virtual environment comprises a virtual machine.

18. A method according to claim 17, wherein the physical data processing system comprises a central processing unit (CPU) and random access memory (RAM) that is operated under control of an operating system.

19. A method according to claim 11, further comprising:
loading the confidentiality policy from the CMDB; and
saving the confidentiality policy in the CMDB, wherein the CMDB is a database configured to store centralized management information related to information technology (IT) service management.

20. A computer program stored on a non-transitory computer storage medium that is executable by a computer to execute the method in claim 11.

* * * * *